(12) United States Patent
Sun et al.

(10) Patent No.: US 11,777,416 B2
(45) Date of Patent: Oct. 3, 2023

(54) FLYBACK CONVERTER AND OUTPUT VOLTAGE ACQUISITION METHOD THEREFOR AND APPARATUS THEREOF

(71) Applicants: SOUTHEAST UNIVERSITY, Nanjing (CN); CSMC TECHNOLOGIES FAB2 CO., LTD., Wuxi (CN)

(72) Inventors: Weifeng Sun, Wuxi (CN); Huaxin Zhang, Wuxi (CN); Hu Zhang, Wuxi (CN); Menglin Yu, Wuxi (CN); Siyu Zhao, Wuxi (CN); Shen Xu, Wuxi (CN); Longxing Shi, Wuxi (CN)

(73) Assignees: SOUTHEAST UNIVERSITY, Nanjing (CN); CSMC TECHNOLOGIES FAB2 CO., LTD., Wuxi (CN)

( * ) Notice: Subject to any disclaimer, the term of this patent is extended or adjusted under 35 U.S.C. 154(b) by 217 days.

(21) Appl. No.: 17/418,606

(22) PCT Filed: Dec. 19, 2019

(86) PCT No.: PCT/CN2019/126597
§ 371 (c)(1),
(2) Date: Jun. 25, 2021

(87) PCT Pub. No.: WO2020/135217
PCT Pub. Date: Jul. 2, 2020

(65) Prior Publication Data
US 2022/0085727 A1 Mar. 17, 2022

(30) Foreign Application Priority Data
Dec. 29, 2018 (CN) .......................... 201811642923.1

(51) Int. Cl.
*H02M 3/335* (2006.01)
(52) U.S. Cl.
CPC ............................. *H02M 3/33592* (2013.01)

(58) Field of Classification Search
None
See application file for complete search history.

(56) References Cited

U.S. PATENT DOCUMENTS 6,385,059 B1 * 5/2002 Telefus ............. H02M 3/33507
363/41
6,434,021 B1 * 8/2002 Collmeyer ........ H02M 3/33507
363/21.01
(Continued)

FOREIGN PATENT DOCUMENTS

CN 101682332 A 3/2010
CN 201993416 U 9/2011
(Continued)

OTHER PUBLICATIONS

PCT International Search Report (w/ English translation) for corresponding PCT Application No. PCT/CN2019/126597 dated Mar. 18, 2020—4 pages.
(Continued)

*Primary Examiner* — Jeffrey A Gblende
(74) *Attorney, Agent, or Firm* — Dority & Manning, P.A.

(57) ABSTRACT

A flyback converter and an output voltage acquisition method therefor and apparatus thereof, wherein the output voltage acquisition method comprises the following steps: acquiring the reference output voltage of a flyback converter; sampling the current output voltage of the flyback converter within a reset time of each switching period among M continuous switching periods of the flyback converter, wherein M is a positive integer; and according to the reference output voltage and the current output voltage, sampling a dichotomy to successively approximate the current output voltage until the M switching periods are finished, and acquiring the output voltage of the flyback converter.

13 Claims, 6 Drawing Sheets

(56) References Cited

U.S. PATENT DOCUMENTS

| | | | | |
|---|---|---|---|---|
| 9,042,075 B2* | 5/2015 | Borini | ............ | H02H 5/083 |
| | | | | 361/178 |
| 9,647,532 B2* | 5/2017 | Bianco | ............ | H05B 45/38 |
| 9,763,289 B2* | 9/2017 | Herfurth | ............ | H05B 47/24 |
| 2007/0236193 A1 | 10/2007 | Vo | | |

FOREIGN PATENT DOCUMENTS

| | | |
|---|---|---|
| CN | 104660261 A | 5/2015 |
| CN | 105262340 A | 1/2016 |
| CN | 105305830 A | 2/2016 |
| CN | 105680697 A | 6/2016 |
| CN | 107342689 A | 11/2017 |
| CN | 107579670 A | 1/2018 |
| CN | 108549039 A | 9/2018 |

OTHER PUBLICATIONS

Chinese First Office Action for corresponding CN Application No. 201811642923.1, 9 pages.
Chinese Second Office Action for corresponding CN Application No. 201811642923.1, 8 pages.

* cited by examiner

FLYBACK CONVERTER AND OUTPUT VOLTAGE ACQUISITION METHOD THEREFOR AND APPARATUS THEREOF

CROSS REFERENCE TO RELATED APPLICATION

The present application is a national phase entry of International Application No. PCT/CN2019/126597, filed Dec. 19, 2019, which, in turn, claims priority to Chinese Patent Application with No. 201811642923.1, entitled "Flyback Converter and Output Voltage Acquisition Method and Apparatus thereof", and filed on Dec. 29, 2018, the contents of both of which are expressly incorporated herein by reference in their entirety.

TECHNICAL FIELD

The present disclosure relates to the field of flyback converter technology, particularly to a flyback converter, and an output voltage acquisition method and apparatus thereof.

BACKGROUND

The statements here only provide background information related to the present disclosure, and do not definitely constitute exemplary technologies.

With the development of electronic devices becoming more portable, isolated power converters have developed rapidly. The flyback converters occupy a major position in the market of the power adapter and charger due to advantages such a high efficiency, a simple structure, and a low cost, etc.

The traditional Primary Side Regulation (PSR) flyback converter obtains the output voltage of the flyback converter by sampling the voltage on the auxiliary winding. However, due to the on-voltage drop and on-resistance of the secondary side diode, a larger output voltage error can be caused: and when the output voltage is larger, a slope of the voltage on the auxiliary winding before the inflection point is very small and can be can be approximated as a direct current voltage after the voltage dividing, then it is difficult to sample the inflection point by two wires.

In order to effectively solve the problem of the secondary side diode, the PSR flyback converter based on the synchronous rectification is widely used, in which the secondary side diode is replaced with a synchronous rectifier transistor, which significantly reduces the original on-voltage drop and on-resistance on the secondary side, thereby reducing the output voltage error. However, the PSR flyback converter based on synchronous rectification also has the above-mentioned problem, that is, when the output voltage is larger, the sampling cannot be performed by two wires.

SUMMARY

According to various embodiments of the present disclosure, a flyback converter, and an output voltage acquisition method and apparatus thereof are provided.

A method for acquiring an output voltage of a flyback converter includes:

acquiring a reference output voltage of the flyback converter;

sampling a current output voltage of the flyback converter within a reset time of each switching period of M continuous switching periods of the flyback converter, wherein M is a positive integer; and successively approximating the current output voltage by using a dichotomy method according to the reference output voltage and the current output voltage until the M switching periods end, and obtaining the output voltage of the flyback converter.

An apparatus for acquiring an output voltage of a flyback converter includes:

a reference voltage acquisition module, configured to acquire a reference output voltage of the flyback converter;

a voltage sampling module, configured to sample a current output voltage of the flyback converter within a reset time of each switching period of M continuous switching periods of the flyback converter, wherein M is a positive integer; and an output voltage acquisition module, configured to successively approximate the current output voltage by using a dichotomy method according to the reference output voltage and the current output voltage until the M switching periods end, and obtain the output voltage of the flyback converter.

A flyback converter includes an apparatus for acquiring an output voltage, the apparatus for acquiring an output voltage includes:

a reference voltage acquisition module, configured to acquire a reference output voltage of the flyback converter;

a voltage sampling module, configured to sample a current output voltage of the flyback converter within a reset time of each switching period of M continuous switching periods of the flyback converter, wherein M is a positive integer; and an output voltage acquisition module, configured to successively approximate the current output voltage by using a dichotomy method according to the reference output voltage and the current output voltage until the M switching periods end, and obtain the output voltage of the flyback converter.

The details of one or more embodiments of the disclosure are set forth in the following drawings and description. Other features, purposes and advantages of the disclosure will become apparent from the description, drawings and claims.

BRIEF DESCRIPTION OF THE DRAWINGS

In order to more clearly describe the technical solution in the embodiments or exemplary technologies of the present disclosure, accompanying drawings that need to be used in the description of the embodiments or exemplary technologies will be briefly introduced. Obviously, the accompanying drawings in the following description are merely some embodiments of the present disclosure. Those of ordinary skill in the art can obtain drawings of other embodiments based on these drawings without creative work.

DETAILED DESCRIPTION

Figure 1:
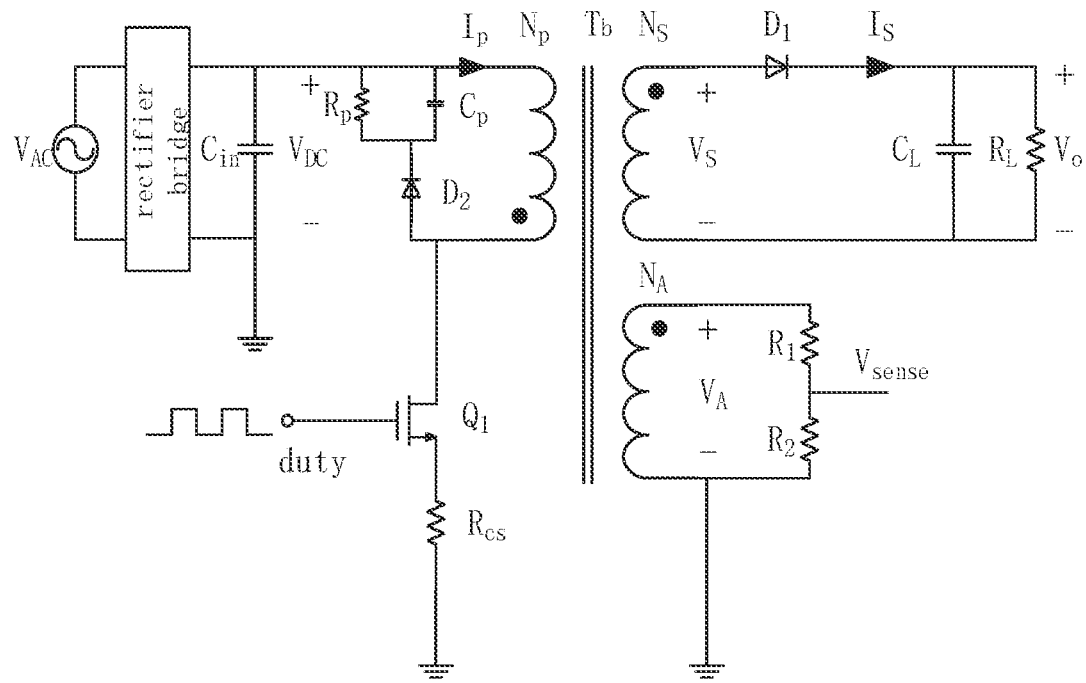
FIG. 1 is a circuit topological diagram of a traditional PSR flyback converter.

In order to make the purposes, technical solution, and advantages of the present disclosure clearer, the present disclosure will be described in detail with reference to the accompanying drawings and embodiments. It should be appreciated that the specific embodiments described here are merely used for explaining the present disclosure, rather than limiting the present disclosure.

In the description of the disclosure, it should be understood that the terms indicating the orientation or position relationship, such as "center", "lateral", "upper", "lower", "left", "right", "vertical", "horizontal", "top", "bottom", "inner", and "outer", etc., are orientations or position relationships shown in the drawings, and are merely for the convenience of describing the disclosure and simplifying the description, rather than indicating or implying that the pointed device or element definitely have a specific orientation, or is constructed and operated in a specific orientation, and therefore these terms cannot be understood as a limitation to the present disclosure. In addition, it should be noted that when an element is referred to as being "formed on another element", it can be directly connected to another element or an intermediate element may exist at the same time. When an element is considered as being "connected" to another element, it can be directly connected to the other element or an intermediate element can exist at the same time. Rather, when an element is referred to as being "directly on" another element, there is no intermediate element.

Figure 2:
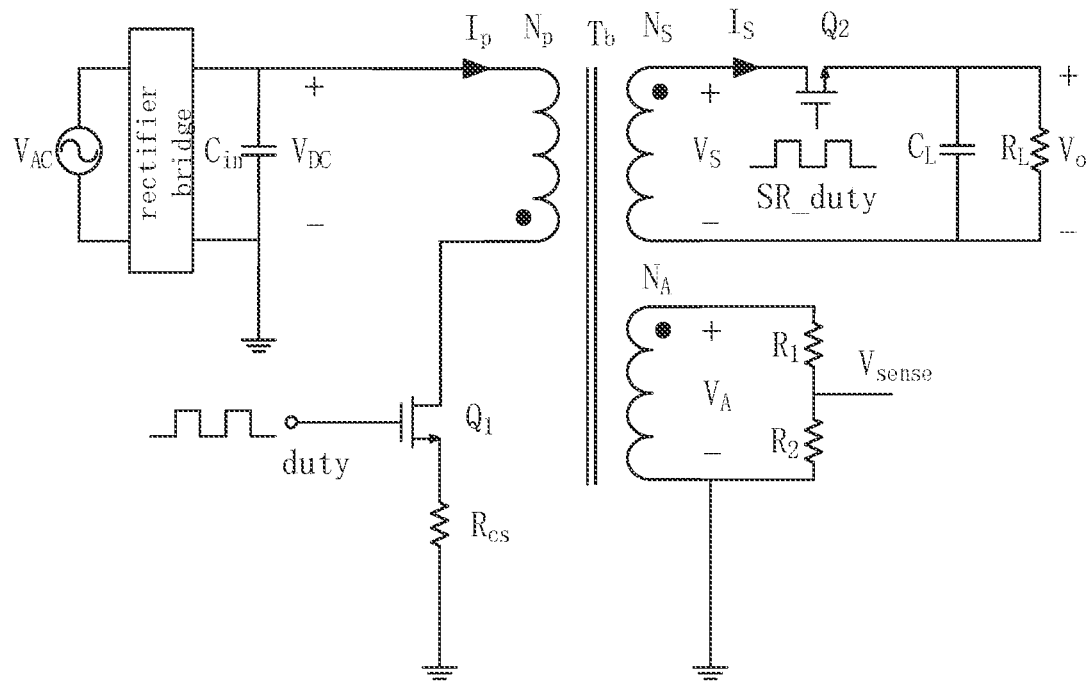
FIG. 2 is a circuit topological diagram of a PSR flyback converter based on a synchronous rectification.

As shown in FIG. 1, the traditional PSR flyback converter obtains an output voltage $V_o$ of the flyback converter by sampling the voltage on the auxiliary winding $N_A$. But due to the on-voltage drop and on-resistance of the secondary side diode D1, a larger output voltage error may be caused; and when the output voltage $V_o$ is larger, a slope of the voltage on the auxiliary winding $N_A$ before an inflection point is very small and can be approximated as a DC voltage after the voltage dividing, so it is difficult to sample at the inflection point by using two wires. In order to effectively solve the problem of the secondary side diode D1, the PSR flyback converter based on the synchronous rectification is widely used. As shown in FIG. 2, the secondary side diode D1 is replaced with a synchronous rectifier transistor $Q_2$, which makes the original on-voltage drop and the on-resistance on the secondary side is significantly reduced, thereby reducing the output voltage error. However, the PSR flyback converter based on the synchronous rectification also has the above-mentioned problem, that is, when the output voltage $V_o$ is larger, the sampling cannot be performed by using two wires.

The disclosure is based on the inventors' knowledge and research on the following issues.

Figure 3:
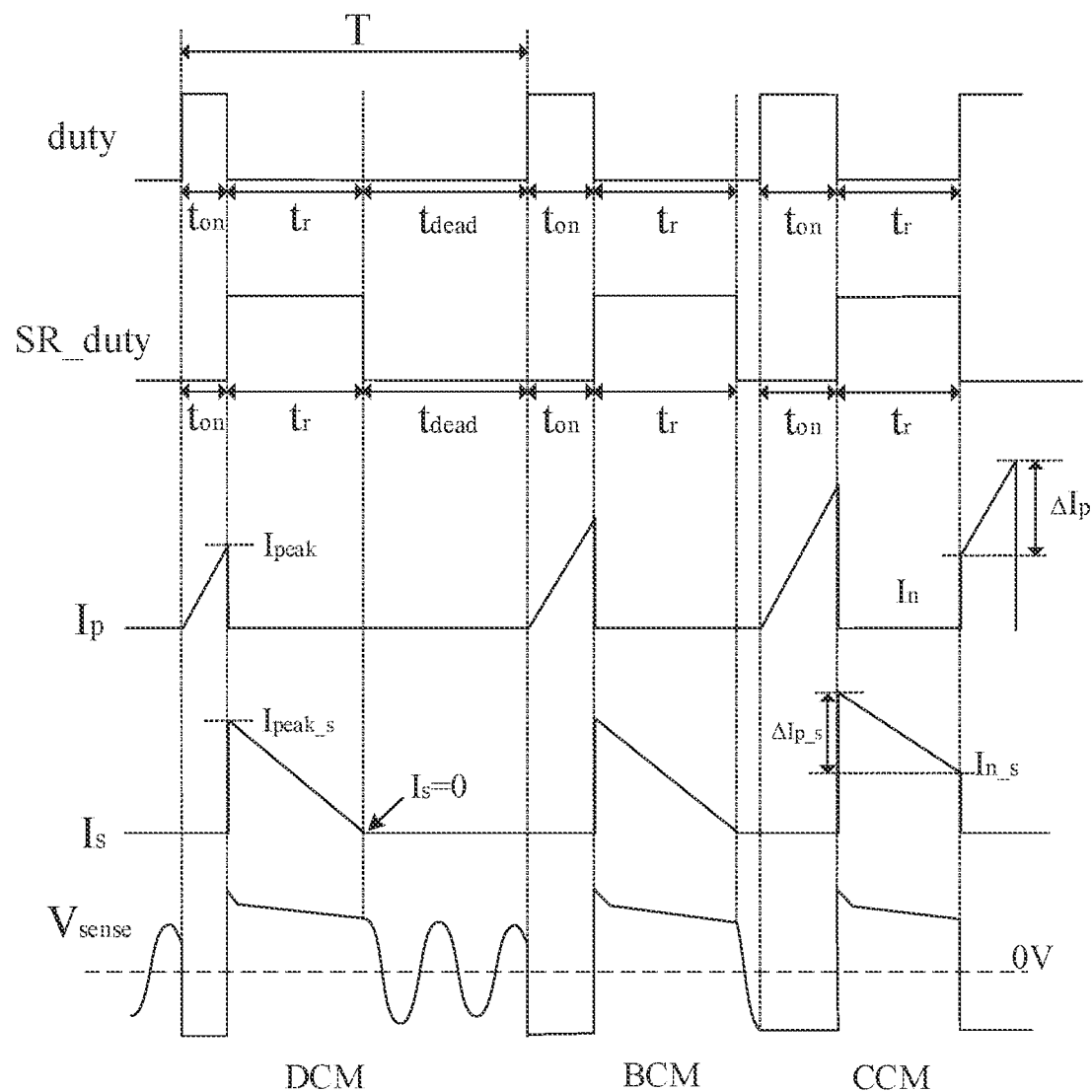
FIG. 3 is an operating waveform diagram of the PSR flyback converter based on the synchronous rectification shown in FIG. 2.

FIG. 3 is an operating waveform diagram of the PSR flyback converter based on the synchronous rectification shown in FIG. 2, "duty" is a switching signal of a primary side main switching transistor $Q_1$, "SR_duty" is a switching signal of a secondary side synchronous rectifier transistor $Q_2$, and $I_p$ is a primary side current, $I_s$ is a secondary side current, and $V_{sense}$ is a voltage on the auxiliary winding $N_A$.

In addition, the PSR flyback converter based on synchronous rectification can generally include three operating modes, namely Discontinuous Conduction Mode (DCM), Boundary Conduction Mode (BCM) and Continuous Conduction Mode (CCM). The following mainly discusses the DCM operating mode.

As shown in FIG. 3, in the DCM operating mode, a switching period T can be divided into three segments, which are on-time $t_{on}$, reset time $t_r$, and dead time $t_{dead}$.

During the on-time $t_{on}$, the primary side main switch $Q_1$ is in the on state, and the primary side of the transformer $T_b$ acts as an inductor to store energy. The primary side current $I_p$ rises linearly from zero until the main switching transistor Q1 is turned off, and the primary side current $I_p$ rises to the maximum value beak. According to the characteristics of homonymous and anonymous ends of the transformer $T_b$, when the current flows in from the homonymous end of the primary side, the secondary side current flows out of the homonymous end of the secondary side; however, since the secondary side synchronous rectifier transistor $Q_2$ is in an off-state during the on-time $t_{on}$, the secondary current $I_s$ is equal to zero by this time, and the sampling voltage $V_{sense}$ of the auxiliary winding $N_A$ is a negative value.

After the main switching transistor $Q_1$ passes the on-time $t_{on}$, the main switching transistor $Q_1$ is in the off-state during the remaining time in the same switching period T. Since the flyback converter operates in the DCM operating mode, a period of time in which the main switching transistor $Q_1$ is off can be divided into two sections, namely the reset time $t_r$ and the dead time $t_{dead}$. During the reset time $t_r$, since the main switching transistor $Q_1$ changes from the on-state to the off-state, the secondary voltage can be reversed according to the inductance characteristics of the transformer $T_b$. At the same time, since the secondary side synchronous rectifier transistor $Q_2$ is in the on-state, the energy stored in the transformer $T_b$ can be released through the secondary side, thereby generating the secondary side current $I_s$, and the current will linearly decrease from the peak value $I_{peak\_s}$ to zero. At the moment when the main switching transistor $Q_1$ is off, due to the functions of the leakage inductance and the parasitic capacitance of the main switching transistor $Q_1$, the sampling voltage $V_{sense}$ of the auxiliary winding $N_A$ may generate a small and short-duration voltage oscillation. After the voltage oscillation disappears, the sampling voltage $V_{sense}$ of the auxiliary winding $N_A$ approximately linearly decays within the reset time $t_r$.

After the reset time $t_r$ ends, in the DCM operating mode, one switching period does not end, and the remaining time is the dead time $t_{dead}$. During the dead time $t_{dead}$, because there is still a part of the energy in the parasitic capacitance of the main switching transistor $Q_1$ that has not been released, the parasitic capacitance of the main switching transistor $Q_1$ resonates with the excitation inductance of the primary side winding $N_p$ until the next switching period T is on. At the same time, since the secondary side current $I_s$ is zero during the dead time $t_{dead}$, and the parasitic capacitance of the main switching transistor $Q_1$ may resonate with the excitation inductance of the primary side winding $N_p$, and the sampling voltage $V_{sense}$ of the auxiliary winding $N_A$ will be in an oscillation state.

Therefore, the above analysis shows that the voltage $V_{sense}$ on the auxiliary winding $N_A$ has different characteristics in the on-time $t_{on}$, reset time $t_r$, and dead time $t_{dead}$. However, due to the existence of the secondary side synchronous rectifier transistor $Q_2$, the slope of the voltage $V_{sense}$ on the auxiliary winding $N_A$ is approximately constant during the reset time $t_r$, the voltage $V_{sense}$ can be considered as a DC voltage; and at the end of the reset time $t_r$, the voltage $V_{sense}$ on the auxiliary winding $N_A$ is equal to an output voltage $V_o$. Accordingly, based on the above characteristics, the disclosure provides a method for acquiring a voltage of a flyback converter, in which the dichotomy principle is adopted to acquire the output voltage of the flyback converter during the reset time of the switching period.

Figure 4:
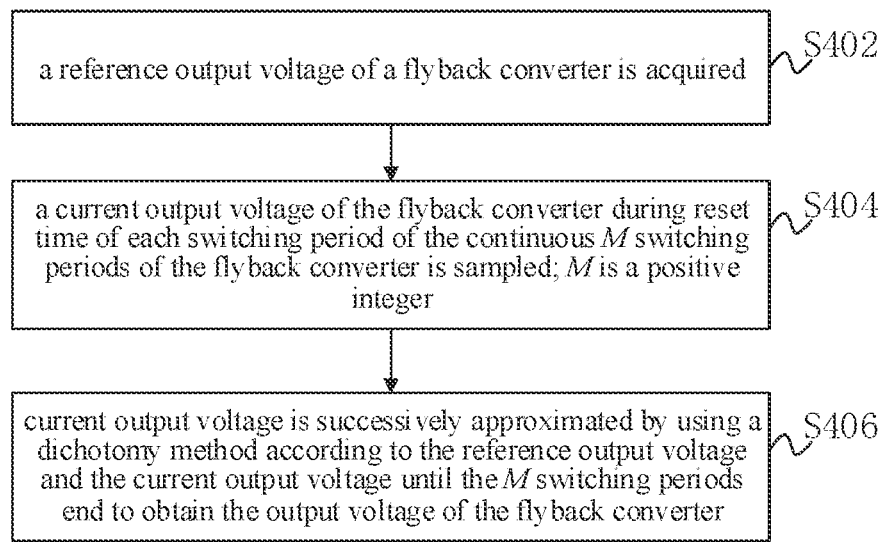
FIG. 4 is a flow chart showing a method for acquiring an output voltage of a flyback converter according to an embodiment of the present disclosure.

FIG. 4 is a flow chart showing a method for acquiring an output voltage of a flyback converter according to an embodiment of the present disclosure. As shown in FIG. 4, the method for acquiring the output voltage of the flyback converter includes the following steps.

Step 402: a reference output voltage of a flyback converter is acquired:

Specifically, when the dichotomy principle is adopted to acquire the output voltage of the flyback converter, a comparison reference value, that is, the reference output voltage, is required. An initial value of the reference output voltage can be acquired in advance.

Figure 5:
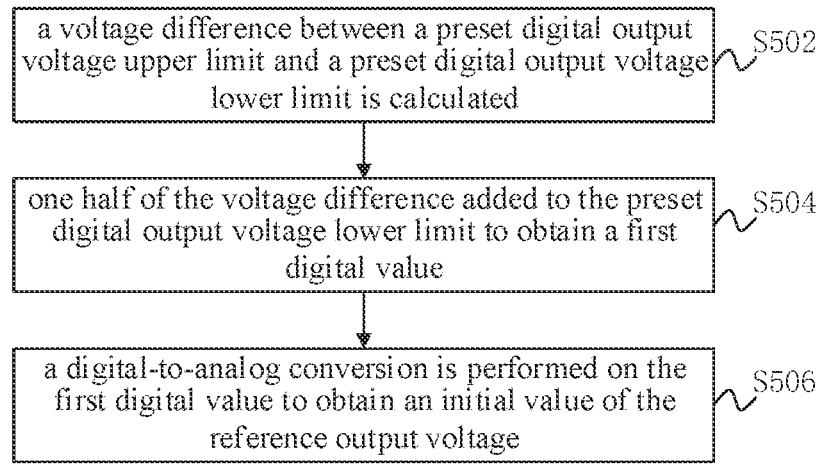
FIG. 5 is a flow chart showing acquisition of a reference output voltage of a flyback converter according to an embodiment of the present disclosure.

In an embodiment, as shown in FIG. 5, the step of acquiring the reference output voltage of the flyback converter includes following steps.

Step 502: a voltage difference between a preset digital output voltage upper limit and a preset digital output voltage lower limit is calculated.

Specifically, the preset digital output voltage upper limit $V_{ref\_max}$ can be a digital value corresponding to the maximum output voltage of the flyback converter plus a certain threshold, and the preset digital output voltage lower limit $V_{ref\_min}$ can be a digital value corresponding to the minimum output voltage of the flyback converter plus a certain threshold, which can specifically be set according to actual situations. For example, in an example, the preset digital output voltage upper limit $V_{ref\_max}$ is 512, and the preset digital output voltage lower limit $V_{ref\_min}$ is 256. By this time, the voltage difference therebetween satisfies $\Delta V = V_{ref\_max} - V_{ref\_min} - V_{ref\_min} = 256$.

Step 504: one half of the voltage difference added to the preset digital output voltage lower limit to obtain a first digital value, i.e., the first digital value satisfies $V_{ref\_digital} = V_{ref\_min} + \Delta V/2$.

Step 506: a digital-to-analog conversion is performed on the first digital value to obtain an initial value of the reference output voltage.

In practical applications, the digital-to-analog conversion can be performed on the first digital value $V_{ref\_digital}$ by a built-in digital-to-analog converter (DAC) of a processor to obtain the initial value of the reference output voltage $V_{ref\_analog}$, or an external digital-to-analog converter can be adopted to perform the digital-to-analog conversion on the first digital value $V_{ref\_analog}$. Since the external digital-to-analog converter takes up a certain amount of space, has a higher cost and a higher power consumption, a built-in digital-to-analog converter is optionally used for the digital-to-analog conversion.

Step 404: a current output voltage of the flyback converter during reset time of each switching period of the continuous M switching periods of the flyback converter is sampled; M is a positive integer.

Specifically, referring to FIG. 2, the voltage $V_{sense}$ on the auxiliary winding $N_A$ can be sampled as the current output voltage of the flyback converter.

Step 306: according to the reference output voltage and the current output voltage, the current output voltage is successively approximated by using the dichotomy method until the M switching periods end, and the output voltage of the flyback converter is obtained.

In other words, according to the waveform of the switching period of the flyback converter, the output voltage can be successively approximated by using the dichotomy principle according to the reference output voltage and the current output voltage within the reset time of each switching period, after the approximating during several switching periods, the output voltage in a current period can be accurately sampled.

Figure 6:
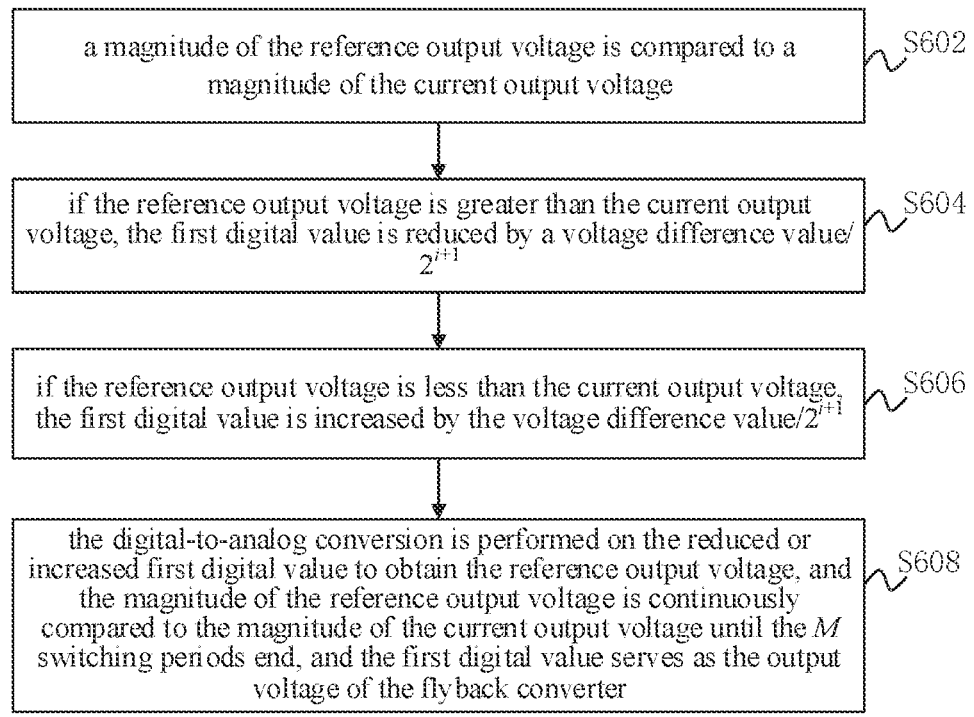
FIG. 6 is a flow chart showing acquisition of an output voltage of a flyback converter by using a dichotomy method according to an embodiment of the present disclosure.

In an embodiment, as shown in FIG. 6, the step of successively approximating the current output voltage by using the dichotomy method according to the reference output voltage and the current output voltage includes the following steps.

Step 602: a magnitude of the reference output voltage is compared with a magnitude of the current output voltage.

Step 604: if the reference output voltage is greater than the current output voltage, the first digital value is reduced by a voltage difference value/$2^{i+1}$, where i is the current number of comparisons between the reference output voltage and the current output voltage, and i is a positive integer.

Step 606: if the reference output voltage is less than the current output voltage, the first digital value is increased by the voltage difference value/$2^{i+1}$.

Step 608: the digital-to-analog conversion is performed on the reduced or increased first digital value to obtain the reference output voltage, and the magnitude of the reference output voltage is continuously compared to the magnitude of the current output voltage until the M switching periods end, and the first digital value serves as the output voltage of the flyback converter.

Specifically, the voltage $V_{sense}$ on the auxiliary winding $N_A$ can be sampled as the current output voltage of the flyback converter during the reset time $t_r$ of the first switching period $T_1$ of the M consecutive switching periods $T(s)$, that is, the current output voltage of the flyback converter is $V_{sense}$, and at the same time, the initial value of the reference output voltage $V_{ref\_analog}$ is acquired. For example, the initial value of the reference output voltage $V_{ref\_analog}$ is an analog value obtained after the digital-to-analog conversion is performed on the first digital value satisfying $V_{ref\_digital} = V_{ref\_min} + \Delta V/2$. Then, the reference output voltage $V_{ref\_analog}$ is compared to the current output voltage $V_{sense}$ for the first time. If the reference output voltage $V_{ref\_analog}$ is greater than the current output voltage $V_{sense}$, the first digital value $V_{ref\_digital}$ is reduced by $\Delta V/2^2$, i.e., the reduced first digital value satisfies $V_{ref\_digital} = V_{ref\_min} + \Delta V/2 - \Delta V/2^2$. Conversely, the first digital value satisfying $V_{ref\_digital}$ is increased by $\Delta V/2^2$, i.e., the increased first digital value satisfies $V_{ref\_digital} = V_{ref\_min} \Delta V/2 + \Delta V/2^2$.

Then, the digital-to-analog conversion is performed on the reduced or increased first digital value $V_{ref\_digital'}$ to obtain a new reference output voltage $V_{ref\_analog'}$; and the voltage on the auxiliary winding $N_A$ is re-sampled to obtain the current output voltage $V_{sense'}$ of the flyback converter. Then, a second comparison is performed between the new reference output voltage $V_{ref\_ananlog'}$ and the current output voltage $V_{sense'}$ obtained by re-sampling. If the reference output voltage $V_{ref\_analog'}$ is greater than the current output voltage $V_{sense'}$, the first digital value $V_{ref\_digital'}$ obtained previously is reduced by $\Delta V/2^3$; conversely, the first digital value $V_{ref\_digital'}$ obtained previously is increased by $\Delta V/2^3$.

By analogy, until the reset time $t_r$ of the first switching period $T_1$ ends, the successive approximation of the output voltage is suspended, and then the output voltage is successively approximated by the above mode within the reset time $t_r$ of the second switching period $T_2$, and so on, until the M switching periods T(s) end, then the acquisition of the output voltage of the flyback converter is completed, and the output voltage $V_{ref\_final}$ of the flyback converter finally obtained is the first digital value obtained after the last comparison. It should be noted that, from the second switching period $T_2$ to the M-th switching period $T_M$, the reference output voltage follows the reference output voltage obtained at the end of the previous switching period to ensure the continuity of the successive approximation of the output voltage.

In an embodiment, M satisfies the following relationship: $2^{N+M} \geq$ voltage difference value, where N is the total number of comparisons between the reference output voltage and the current output voltage in one switching period.

Specifically, if within the reset time $t_r$ of the first switching period $T_1$, the reference output voltage can be compared with the current output voltage successfully N times, then after each switching period T, the range of the output voltage can be reduced to $\frac{1}{2^N}$ of that in the previous period; if $2^{N+M} \geq$ voltage difference value $\Delta V$, it means that after M switching; periods T(s), and after N comparisons in each switching period T, the output voltage $V_{ref\_final}$ of the current period of the flyback converter can be accurately sampled. Therefore, within the reset time of each switching period of the M continuous switching periods of the flyback converter, the current output voltage of the flyback converter is sampled, and the current output voltage is successively approximated by using the dichotomy method according to the reference output voltage and the current output voltage, until the M switching periods end, then the output voltage of the current period of the flyback converter can be accurately obtained.

Figure 7:
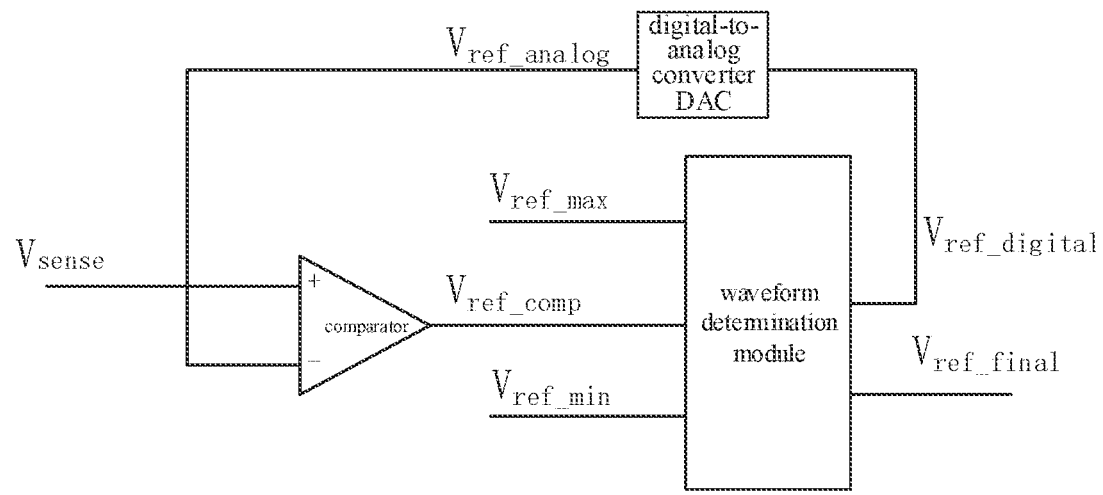
FIG. 7 is a schematic diagram of acquiring an output voltage of a flyback converter according to an embodiment of the present disclosure.

In order to enable those skilled in the art to understand this application more clearly, referring to FIG. 7, an upper limit of the output voltage inputted to a waveform determination module can be specified as $V_{ref\_max}$, and a lower limit of the output voltage is $V_{ref\_min}$, and the voltage difference value therebetween satisfies $\Delta V = V_{ref\_max} - V_{ref\_min}$, and the voltage digital quantity that the waveform determination module outputs to the digital-to-analog converter for the first time satisfies $V_{ref\_digital} = V_{ref\_min} + \Delta V/2$.

After that, the voltage $V_{sense}$ on the auxiliary winding $N_A$ is sampled during the reset time $t_r$, and the voltage digital quantity $V_{ref\_digital}$ outputted by the waveform determination module to the analog-to-digital converter for the first time is converted into an analog quantity $V_{ref\_analog}$ through the digital-to-analog converter. Then, the voltage $V_{sense}$ on the auxiliary winding $N_A$ is compared to the analog quantity $V_{ref\_analog}$ outputted by the digital-to-analog converter for the first time to obtain a comparison signal $V_{ref\_comp}$, and then a voltage digital quantity $V_{ref\_digtal}$ outputted by the waveform determination module to the digital-to-analog converter for the second time is determined according to the comparison signal $V_{ref\_comp}$ and the dichotomy principle. If $V_{sense}$ is greater than $V_{ref\_analog}$, then the comparison signal $V_{ref\_comp}$ is equal to 1, and accordingly the voltage digital quantity $V_{ref\_digital}$ outputted by the waveform determination module to the digital-to-analog converter for the second time is equal to $V_{ref\_min} + \Delta V/2 + \Delta V/4$. Conversely, the comparison signal $V_{ref\_comp}$ is 0, and accordingly the voltage digital quantity $V_{ref\_digital}$ outputted by the waveform determination module to the digital-to-analog converter for the second time is equal to $V_{ref\_min} + \Delta V/2 - \Delta V/4$.

By analogy, if the comparison is successfully performed N times within the reset time $t_r$ of the first switching period $T_1$, then after each switching period T, the range of the output voltage can be reduced to $\frac{1}{2^N}$ of that in the previous switching period T; if $2^{N+M} \geq$ Voltage difference value $\Delta V$, it means that after M switching periods T(s) and after N comparisons in each switching period T, the output voltage $V_{ref\_final}$ of the current period of the flyback converter can be accurately sampled. The obtained output voltage $V_{ref\_final}$ is the voltage digital quantity $V_{ref\_digital}$ obtained by the last calculation and outputted by the waveform determination module to the digital-to-analog converter.

Figure 8:
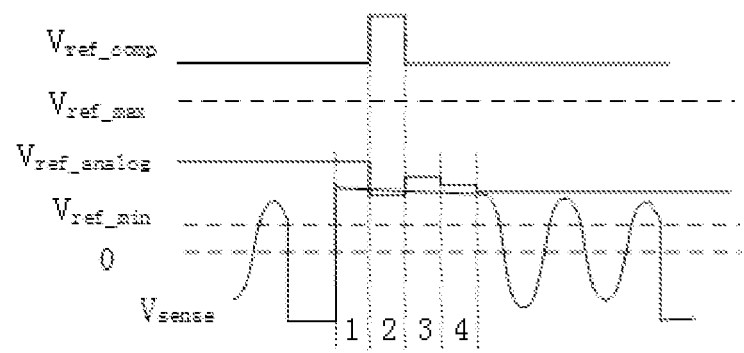
FIG. 8 is an operating waveform diagram of a flyback converter during a reset time of a first switching period according to an embodiment of the present disclosure.

Optionally, as a specific example, FIG. 8 is an operating waveform diagram of a flyback converter during the reset time of the first switching period according to an embodiment of the present disclosure. $V_{sense}$ is the sampling voltage on the auxiliary winding $N_A$, and $V_{ref\_comp}$ is a comparison signal outputted by a comparator, $V_{ref\_max}$ is an output voltage upper limit, and $V_{ref\_min}$ is an output voltage lower limit. Assuming that a switching frequency of the flyback converter is 100 kHz, a conversion rate of the digital-to-analog converter is 1 MHz, $V_{ref\_max} = 512$, $V_{ref\_min} = 256$, then the voltage difference value satisfies $\Delta V = V_{ref\_max} - V_{ref\_min} = 256$. The digital-to-analog converter can perform the conversion ten times during one switching period T, while the digital-to-analog converter can perform the conversion four times during the reset time.

According to the dichotomy principle, the voltage digital quantity $V_{ref\_digital}$ outputted by the waveform determination module to the digital-to-analog converter for the first time is 384, that is, $V_{ref\_min} + \Delta V/2 = 384$. It can be seen from FIG. 8 that the analogy voltage quantity $V_{ref\_analog}$ outputted by the analog-to-digital converter for the first time is greater than the sampling voltage $V_{sense}$ on the auxiliary winding $N_A$. By this time, the comparison signal outputted by the comparator is 0, and the voltage digital quantity $V_{ref\_digital}$ needs to be further reduced. According to the dichotomy principle, the voltage digital quantity $V_{ref\_digital}$ outputted by the waveform determination module to the digital-to-analog converter for the second time is 320, that is, $V_{ref\_min} + \Delta V/2 - \Delta V/4 = 320$. It can be seen from FIG. 8 that the voltage analog quantity $V_{ref\_analog}$ outputted by the digital-to-analog converter for the second time is smaller than the sampling voltage $V_{sense}$ on the auxiliary winding $N_A$, by this time the comparison signal outputted by the comparator is 1, and the voltage digital quantity $V_{ref\_digital}$ needs to be further increased. According to the dichotomy principle, the voltage digital quantity $V_{ref\_digital}$ outputted by the waveform determination module to the digital-to-analog converter for the third time is equal to 352, that is, $V_{ref\_min} + \Delta V/2 - \Delta\Delta V/4 + \Delta V/8 = 352$. It can be seen from FIG. 8 that the voltage analog quantity $V_{ref\_analog}$ outputted by the digital-to-analog converter for the third time is smaller than the sampling voltage $V_{sense}$ on the auxiliary winding $N_A$. By this time, the comparison signal outputted by the comparator is 0, and the voltage digital quantity $V_{ref\_digital}$ needs to be further reduced. According to the dichotomy principle, the voltage digital quantity $V_{ref\_digital}$ outputted by the waveform determination module to the digital-to-analog converter for the fourth time is equal to 336, that is, $V_{ref\_min} + \Delta V/2 - \Delta V/4 + \Delta V/8 - \Delta V/16 = 336$. FIG. 8 shows that the voltage analog quantity $V_{ref\_analog}$ outputted by the digital-to-analog converter for the fourth time is greater than the sampling voltage $V_{sense}$ on the auxiliary winding $N_A$. By this time, the comparison signal outputted by the comparator is 0, and the voltage digital quantity $V_{ref\_digital}$ needs to be further reduced. According to the dichotomy principle, the voltage digital quantity $V_{ref\_digital}$ outputted by the waveform determination module to the digital-to-analog converter for the fifth time is equal to 328, that is, $V_{ref\_min}+\Delta V/2-\Delta V/4+\Delta V/8-\Delta V/16-\Delta V/32=328$. However, since only four comparisons are allowed within the reset time $t_r$ of one switching period T, the result 328 produced by the fourth comparison cannot act in the switching period T, but can serve as an initial value within the reset time $t_r$ of next switching period T for comparison.

Through the above analysis, it can be found that within the reset time $t_r$ of one switching period T, a variation range of the voltage digital quantity $V_{ref\_digital}$ is reduced from the initial $\Delta V=256$ to $\Delta V/24=16$, which indicates that four successful comparisons within the reset time $t_r$ of one switching period T can reduce the range of the output voltage by 16 times; then after four successful comparisons in another one switching period T, the range of the output voltage can be reduced again by 16 times, that is, $\Delta V/2^8=1$, accordingly the output voltage can be accurately sampled by using the dichotomy principle within the reset time.

In this embodiment, the current output voltage of the flyback converter is sampled during the reset time of each switching period of the M continuous switching periods of the flyback converter, and the current output voltage is successively approached by using the dichotomy method according to the reference output voltage and the current output voltage until the M switching periods end, accordingly an accurate output voltage of the flyback converter can be obtained, which effectively solves the problem that the output voltage cannot be accurately sampled by using two wires when the output voltage is larger. In practical applications, it is also possible to increase the determination of the output voltage, and the voltage acquisition method of this disclosure can be adopted when the output voltage is larger, while the traditional method can be adopted when the output voltage is smaller. For example, when the voltage $V_{sense}$ on the auxiliary winding $N_A$ is greater than the preset voltage threshold, the above-mentioned dichotomy principle is adopted to obtain the output voltage; when the voltage $V_{sense}$ on the auxiliary winding $N_A$ is less than or equal to the preset voltage threshold, the traditional voltage obtaining method is directly adopted to reduce the amount of calculations.

It should be noted that the digital-to-analog converter and comparator shown in FIG. 7 can be an external digital-to-analog converter and an external comparator; and the waveform determination module can be a processor. In view of the cost issue, optionally, the digital-to-analog converter and the comparator may be a built-in digital-to-analog converter and a built-in comparator, both of which are integrated in the processor. For example, a single chip microcomputer with a digital-to-analog conversion function can be used.

Figure 9:
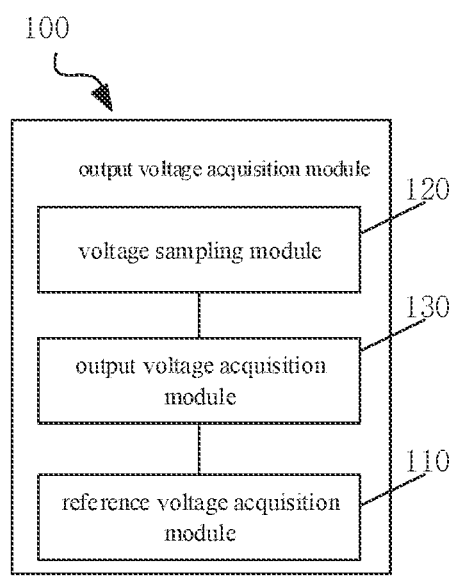
FIG. 9 is a block diagram illustrating an apparatus for acquiring an output voltage of a flyback converter according to an embodiment of the present disclosure.

Optionally, in an embodiment, as shown in FIG. 9, the flyback converter includes a main switching transistor and a synchronous rectifier transistor, and after the output voltage of the flyback converter is obtained, the method further includes the following steps.

Step 902: a duty cycle signal is generated according to the output voltage.

Step 904: a first control signal and a second control signal are generated according to the duty cycle signal.

Step 906: the main switch transistor is controlled according to the first control signal, and the synchronous rectifier transistor is controlled according to the second control signal, to make the flyback converter output a constant voltage.

Specifically, after the output voltage of the flyback converter is obtained, a Proportional Integral (PI) adjustment can be performed on a voltage difference value between the output voltage and the target voltage to generate the duty cycle signal d, and then the first control signal "duty" and the second control signal "SR_duty" are generated by using a Pulse Width Modulation (PWM) control mode according to the duty cycle signal d; and the main switching transistor $Q_1$ in FIG. 2 is controlled according to the first control signal "duty", and the synchronous rectifier transistor $Q_2$ in FIG. 2 is controlled according to the second control signal "SR_duty", so that the flyback converter outputs a constant voltage.

In this embodiment, the flyback converter is controlled according to the obtained output voltage, which can ensure that the flyback converter can maintain a constant voltage output during the entire process, thereby ensuring the reliability of system operation.

It should be understood that although the various steps in the flow charts of FIGS. 4-6 are displayed in sequence as indicated by the arrows, these steps are not definitely performed in sequence in an order indicated by the arrows. Unless there is a clear description in the disclosure, there is no strict order for the execution of these steps, and these steps can be executed in other orders. Moreover, at least part of the steps in FIGS. 4-6 may include multiple sub-steps or multiple stages. These sub-steps or stages are not definitely executed at the same time, but can be executed at different time. These sub-steps or stages are not definitely performed sequentially, but may be performed in turns or alternately with at least a part of other steps or sub-steps or stages of other steps.

In an embodiment, an apparatus for acquiring an output voltage of a flyback converter is provided. As shown in FIG. 9, the apparatus 100 for acquiring an output voltage of a flyback converter includes: a reference voltage acquisition module 110, a voltage sampling module 120, and an output voltage acquisition module 130.

Specifically, the reference voltage acquisition module 110 is configured to acquire a reference output voltage of the flyback converter. The voltage sampling module 120 is configured to sample a current output voltage of the flyback converter within a reset time of each switching period of M continuous switching periods of the flyback converter; M is a positive integer. The output voltage acquisition module 130 is configured to successively approximate the current output voltage by using a dichotomy method according to the reference output voltage and the current output voltage until the M switching periods end, to obtain the output voltage of the flyback converter.

In an embodiment, the reference voltage acquisition module 110 is specifically configured to: calculate a voltage difference value between a preset digital output voltage upper limit and a preset digital output voltage lower limit; add one half of the voltage difference value to the preset digital output voltage lower limit to obtain a first digital value; and perform a digital-to-analog conversion on the first digital value to obtain an initial value of the reference output voltage.

In an embodiment, the output voltage acquisition module 130 is specifically configured to: compare a magnitude of the reference output voltage with a magnitude of the current output voltage; reduce the first digital value by the voltage difference value/$2^{i+1}$ if the reference output voltage is greater than the current output voltage (here i is the current number of comparisons between the reference output voltage and the current output voltage, and i is a positive integer); increase the first digital value by the voltage difference value/$2^{i+1}$ if the reference output voltage is less than the current output voltage; perform the digital-to-analog conversion on the reduced or increased first digital value to obtain the reference output voltage; and continue to compare the magnitude of the reference output voltage to the magnitude of the current output voltage until the M switching periods end; and serve the first digital value as the output voltage of the flyback converter.

In an embodiment, M satisfies the following relationship: $2^{N+M} \geq$ voltage difference value, where N is the total number of comparisons between the reference output voltage and the current output voltage in one switching period.

In an embodiment, a flyback converter is provided, which includes the above-mentioned apparatus for acquiring an output voltage.

For the specific limitations of the apparatus 100 for acquiring the output voltage and the flyback converter, reference can be made to the above limitations of the method for acquiring the output voltage, which will not be repeated here. The various modules in the above-mentioned apparatus 100 for acquiring the output voltage may be implemented in whole or in part by software, hardware, and combinations thereof. The above-mentioned modules can be embedded in the computer device in the form of hardware or independent of the processor, or may be stored in the memory of the computer device in the form of software, so that the processor can call and execute the operations corresponding to the above-mentioned modules.

The technical features of the above-mentioned embodiments can be combined arbitrarily. In order to make the description concise, all possible combinations of the various technical features in the above-mentioned embodiments are not described. However, as long as there is no contradiction in the combinations of these technical features, all should be considered as the scope of the present disclosure.

The above-mentioned embodiments are merely several exemplary embodiments of the present disclosure, and the description is relatively specific and detailed, but it should not be understood as a limitation to the scope of the patent disclosure. It should be noted that those of ordinary skill in the art can make several modifications and improvements without departing from the concept of the disclosure, and these all fall within the protection scope of the disclosure. Therefore, the scope of protection of the disclosure shall be subject to the appended claims.

What is claimed is:

1. A method for acquiring an output voltage of a flyback converter, comprising:
   acquiring a reference output voltage of the flyback converter;
   sampling a current output voltage of the flyback converter within a reset time of each switching period of M continuous switching periods of the flyback converter, wherein M is a positive integer; and
   successively approximating the current output voltage by using a dichotomy method according to the reference output voltage and the current output voltage until the M switching periods end, and obtaining the output voltage of the flyback converter;
   wherein the acquiring the reference output voltage of the flyback converter comprises:
   calculating a voltage difference value between a preset digital output voltage upper limit and a preset digital output voltage lower limit,
   adding one half of the voltage difference value to the preset digital output voltage lower limit to obtain a first digital value; and
   performing a digital-to-analog conversion on the first digital value to obtain an initial value of the reference output voltage.

2. The method according to claim 1, wherein the successively approximating the current output voltage by using the dichotomy method according to the reference output voltage and the current output voltage comprises:
   comparing a magnitude of the reference output voltage with a magnitude of the current output voltage;
   reducing the first digital value by the voltage difference value/$2^{i+1}$ if the reference output voltage is greater than the current output voltage, wherein i is a current number of comparisons between the reference output voltage and the current output voltage, and i is a positive integer;
   increasing the first digital value by the voltage difference value/$2^{i+1}$ if the reference output voltage is less than the current output voltage; and
   performing the digital-to-analog conversion on the reduced or increased first digital value to obtain the reference output voltage, and continuing to compare the magnitude of the reference output voltage with the magnitude of the current output voltage until the M switching periods end, and serving the first digital value as the output voltage of the flyback converter.

3. The method according to claim 2, wherein the M satisfies a following relationship:
   $2^{N+M} \geq$ the voltage difference value, wherein N is a total number of comparisons between the reference output voltage and the current output voltage in one switching period.

4. The method according to claim 1, wherein the flyback converter comprises a main switching transistor and a synchronous rectifier transistor, and the method further comprises:
   after obtaining the output voltage of the flyback converter, generating a duty cycle signal according to the output voltage;
   generating a first control signal and a second control signal according to the duty cycle signal; and
   controlling the main switching transistor according to the first control signal, and controlling the synchronous rectifier transistor according to the second control signal, to make the flyback converter output a constant voltage.

5. An apparatus for acquiring an output voltage of a flyback converter, comprising:
   a reference voltage acquisition module, configured to acquire a reference output voltage of the flyback converter;
   a voltage sampling module, configured to sample a current output voltage of the flyback converter within a reset time of each switching period of M continuous switching periods of the flyback converter, wherein M is a positive integer; and
   an output voltage acquisition module, configured to successively approximate the current output voltage by using a dichotomy method according to the reference output voltage and the current output voltage until the M switching periods end, and obtain the output voltage of the flyback converter;
   wherein the reference voltage acquisition module is specifically configured to:

calculate a voltage difference value between a preset digital output voltage upper limit and a preset digital output voltage lower limit;

add one half of the voltage difference value to the preset digital output voltage lower limit to obtain a first digital value; and perform a digital-to-analog conversion on the first digital value to obtain an initial value of the reference output voltage.

6. The apparatus according to claim 5, wherein the output voltage acquisition module is specifically configured to:

compare a magnitude of the reference output voltage with a magnitude of the current output voltage;

reduce the first digital value by the voltage difference value/$2^{i+1}$ if the reference output voltage is greater than the current output voltage, wherein i is a current number of comparisons between the reference output voltage and the current output voltage, and i is a positive integer;

increase the first digital value by the voltage difference value/$2^{i+1}$ if the reference output voltage is less than the current output voltage; and perform a digital-to-analog conversion on the reduced or increased first digital value to obtain the reference output voltage, and continue to compare the magnitude of the reference output voltage with the current output voltage until the M switching periods end, and serve the first digital value as the output voltage of the flyback converter.

7. The apparatus according to claim 6, wherein the M satisfies a following relationship:

$2^{N+M} \geq$ the voltage difference value, wherein N is a total number of comparisons between the reference output voltage and the current output voltage in one switching period.

8. The apparatus according to claim 5, wherein the flyback converter comprises a main switching transistor and a synchronous rectifier transistor, and the reference voltage acquisition module is configured to:

after obtaining the output voltage of the flyback converter, generate a duty cycle signal according to the output voltage;

generate a first control signal and a second control signal according to the duty cycle signal; and control the main switching transistor according to the first control signal, and control the synchronous rectifier transistor according to the second control signal, to make the flyback converter output a constant voltage.

9. A flyback converter, comprising an apparatus for acquiring an output voltage, wherein the apparatus for acquiring the output voltage comprises:

a reference voltage acquisition module, configured to acquire a reference output voltage of the flyback converter;

a voltage sampling module, configured to sample a current output voltage of the flyback converter within a reset time of each switching period of M continuous switching periods of the flyback converter, wherein M is a positive integer; and an output voltage acquisition module, configured to successively approximate the current output voltage by using a dichotomy method according to the reference output voltage and the current output voltage until the M switching periods end, and obtain the output voltage of the flyback converter;

wherein the reference voltage acquisition module is specifically configured to:

calculate a voltage difference value between a preset digital output voltage upper limit and a preset digital output voltage lower limit;

add one half of the voltage difference value to the preset digital output voltage lower limit to obtain a first digital value; and perform a digital-to-analog conversion on the first digital value to obtain an initial value of the reference output voltage.

10. The flyback converter according to claim 9, wherein a built-in digital-to-analog converter of the flyback converter is adopted to perform the digital-to-analog conversion on the first digital value to obtain the initial value of the reference output voltage.

11. The flyback converter according to claim 9, wherein the output voltage acquisition module is specifically configured to:

compare a magnitude of the reference output voltage with a magnitude of the current output voltage;

reduce the first digital value by the voltage difference value/$2^{i+1}$ if the reference output voltage is greater than the current output voltage, wherein i is a current number of comparisons between the reference output voltage and the current output voltage, and i is a positive integer;

increase the first digital value by the voltage difference value/$2^{i+1}$ if the reference output voltage is less than the current output voltage, and perform a digital-to-analog conversion on the reduced or increased first digital value to obtain the reference output voltage, and continue to compare the magnitude of the reference output voltage with the magnitude of the current output voltage until the M switching periods end, and serve the first digital value as the output voltage of the flyback converter.

12. The flyback converter according to claim 11, wherein the M satisfies a following relationship:

$2^{N+M} \geq$ the voltage difference value, wherein N is a total number of comparisons between the reference output voltage and the current output voltage in one switching period.

13. The flyback converter according to claim 9, wherein the flyback converter further comprises a main switching transistor and a synchronous rectifier transistor, and the reference voltage acquisition module is further configured to:

after obtaining the output voltage of the flyback converter, generate a duty cycle signal according to the output voltage;

generate a first control signal and a second control signal according to the duty cycle signal; and control the main switching transistor according to the first control signal, and control the synchronous rectifier transistor according to the second control signal, to make the flyback converter output a constant voltage.

\* \* \* \* \*